Sept. 29, 1970  L. G. TURK ET AL  3,530,533

LOADER FOR TIRE CURING PRESS

Filed April 8, 1968  6 Sheets-Sheet 1

INVENTORS.
LEONARD G. TURK
ERNEST S. ULM
BENJAMIN STOYANOV
BY
Oberlin, Maky, Donnelly & Renner
ATTORNEYS INVENTORS.
LEONARD G. TURK
ERNEST S. ULM
BENJAMIN STOYANOV
BY
*Oberlin, Maky, Donnelly & Renner*
ATTORNEYS

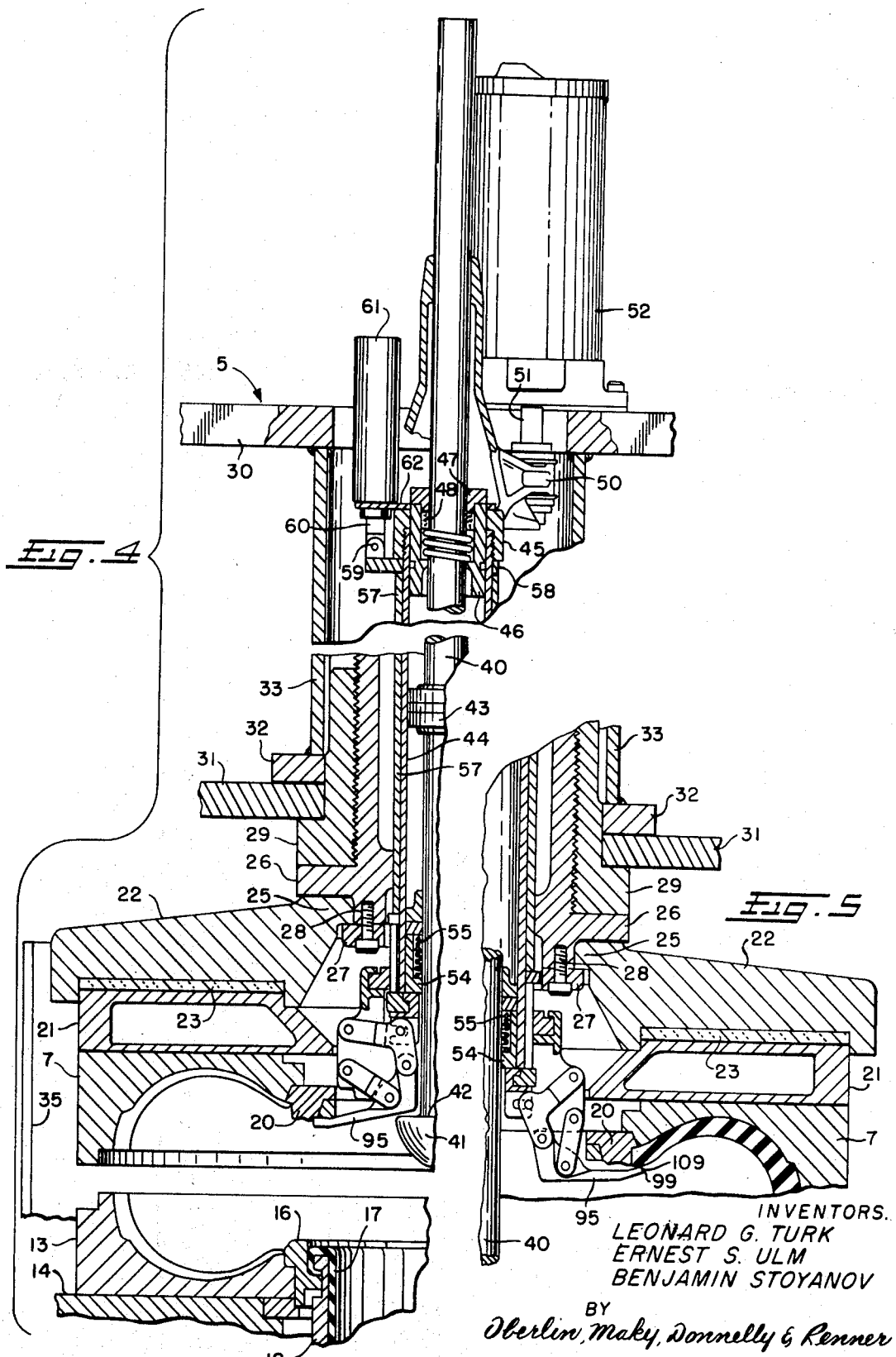

Sept. 29, 1970   L. G. TURK ET AL   3,530,533
LOADER FOR TIRE CURING PRESS
Filed April 8, 1968   6 Sheets-Sheet 4

INVENTORS.
LEONARD G. TURK
ERNEST S. ULM
BENJAMIN STOYANOV
BY
*Oberlin, Maky, Donnelly & Renner*
ATTORNEYS

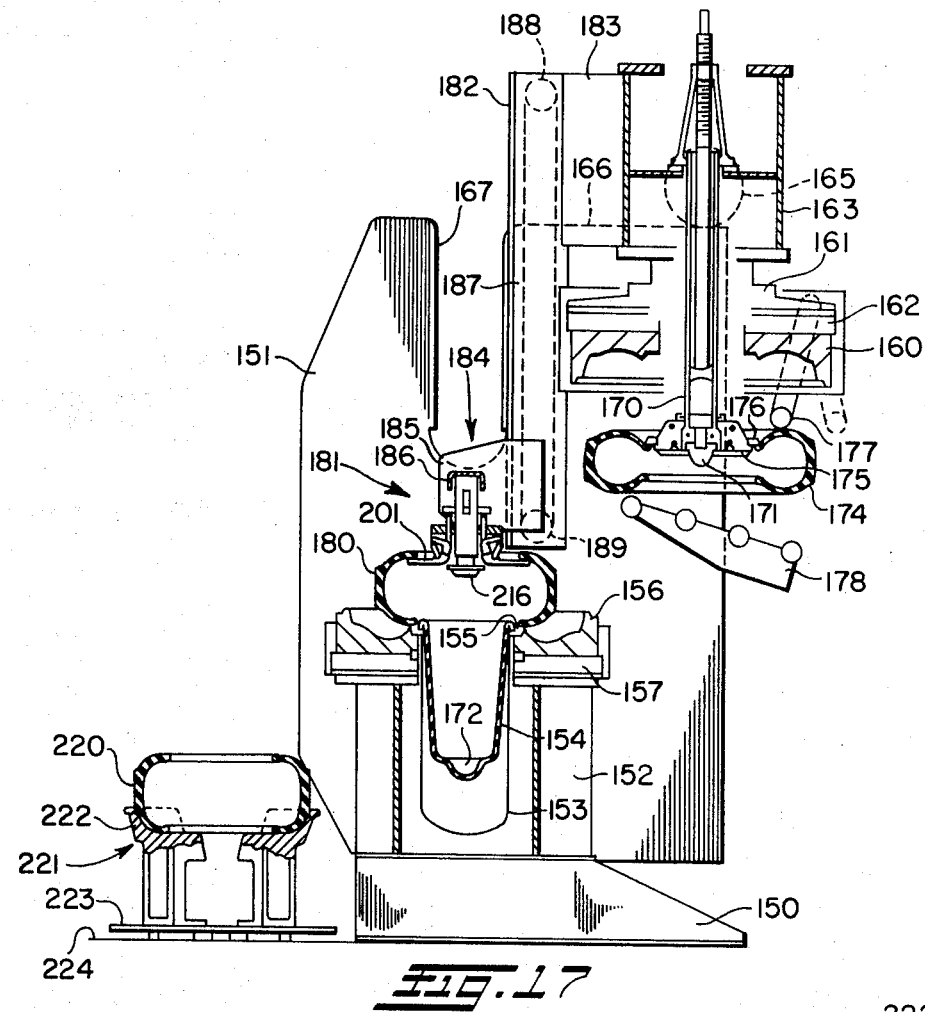
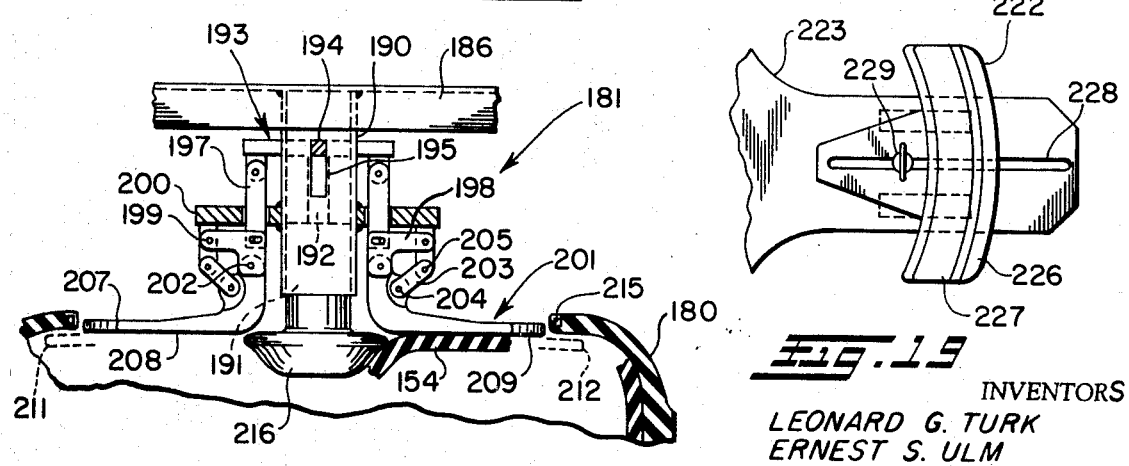

United States Patent Office 3,530,533
Patented Sept. 29, 1970

3,530,533
LOADER FOR TIRE CURING PRESS
Leonard G. Turk, Akron, Ernest S. Ulm, Stow, and Benjamin Stoyanov, Akron, Ohio, assignors to NRM Corporation, a corporation of Ohio
Continuation-in-part of application Ser. No. 444,530, Apr. 1, 1965, now Patent No. 3,378,882. This application Apr. 8, 1968, Ser. No. 719,391
Int. Cl. B29h 5/02
U.S. Cl. 18—2
9 Claims

ABSTRACT OF THE DISCLOSURE

A self-loading tire curing press having a loading mechanism which may be in one of the mold sections first placing the green tire in registry with the mold section incorporating the loader and then moving the mold section with the green tire in registry therewith until the green tire comes into registry with the other mold section; closing the press to shape and cure the green tire and then utilizing the loading mechanism to strip the cured tire from the mold sections. Alternatively, the loader may be mounted on or in front of the press to place the green tire on the stationary mold section, the loader confining the bladder for swelling into the green tire.

DISCLOSURE

This application is a continuation-in-part of applicants' copending application Ser. No. 444,530, filed Apr. 1, 1965 entitled "Loader for Tire Curing Press," now Pat. No. 3,378,882.

This invention relates generally as indicated to a tire curing press and more particularly to a tire curing press incorporating therein an improved press loading mechanism.

Tire presses have heretofore been loaded by hand and by a variety of so-called automatic loading mechanisms which position the tire to be cured on the bottom mold section of the press. In a hand loading operation, the operator might toss a cylindrical green tire over an upstanding bladder forming mechanism, if the press is provided with such, and then manually shove the green tire downwardly to be in proper registry with the bottom mold section. Further manual positioning of the tire may be required, especially for larger tire sizes, as the press closes to ensure that the tire is in proper registry with the upper mold section.

In the so-called automatic press loading mechanisms, the tire to be cured is positioned in registry with the bottom mold section by placement or dropping, but still may require manual shoving or tugging especially when dropped and also especially in the case of larger tires, to be properly registered with the upper mold sections as the press closes. For an example of the more sophisticated press loading mechanisms currently in wide use in the tire industry, reference may be had to Mallory et al. U.S. Pat. No. 3,065,499 and the Heston et al., Pat. No. 3,229,329, entitled "Tire Curing Press and Loader Therefor." Both of the above illustrate loader mechanisms which have met with wide commercial success in use with the widely known "Autoform" tire curing press manufactured and sold by the NRM Corporation of Akron, Ohio.

In the above copending Heston et al. pation, the green tire is lifted by its upper bead from a loading stand in the front of the press and held in position in registry with the bottom mold section as the tire forming bladder is inflated therein. However, it will be appreciated that the loading mechanism requires substantial complex machinery to lift the green tire from the stand and then place the same in proper registry with the lower mold section. The loader mechanism must then be removed before the press can close upon the tire held by the forming bladder.

With the present invention, there has been developed what may be termed a self-loading press wherein the loading mechanism is incorporated in the press itself and does not require complex and space consuming mechanisms mounted on or adjacent the press. Moreover, with the loading mechanism of the present invention, the green tire may first be brought into registry with the upper mold section and the closing movements of the press may then be utilized to register the green tire with the lower mold section.

It is accordingly a principal object of the present invention to provide a self-loading tire curing press requiring no complex space consuming loading mechanism.

A further principal object is the provision of a tire press which incorporates a loading mechanism which will lift a green tire into registry with the upper mold section while the press is open for loading.

Another object is the provision of a tire curing press having built therein an expansible plate type chuck adapted to engage beneath the upper bead of a green tire and position and center the same in proper registry with both the upper and lower mold sections.

A further object is the provision of a tire curing press including a tire loading chuck built into the upper mold section which also may be employed to strip the tire from the lower mold section after the curing cycle and unload the press.

Yet another object is the provision of a self-loading press providing improved centering of the tire with respect to both the upper and lower mold sections as well as improved centering of the bladder in the tire.

Still another object is the provision of a tire curing press with the above improved loading features which does not require an accessory loading mechanism or attachment.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

In said annexed drawings:

FIG. 1 is an enlarged fragmentary vertical section taken

3 through the chuck mechanism in the upper mold section of the press;

FIG. 4 is a fragmentary broken vertical section of the press in its substantially closed position illustrating the various operating mechanisms for the tire chuck;

FIG. 5 is a fragmentary vertical section similar to FIG. 4 illustrating the press in its closed position and the chuck moved to underlie the upper bead of the tire prior to unloading with the ram extended inverting the bladder;

FIG. 17 is a side elevation partially in section of a tire press utilizing the loading chuck mechanism of the present invention;

FIG. 18 is an enlarged detail view partially in section of the loading chuck of FIG. 17; and FIG. 19 is an enlarged fragmentary top plan view of the stand seen in FIG. 17.

THE TIRE PRESS

Figure 6:
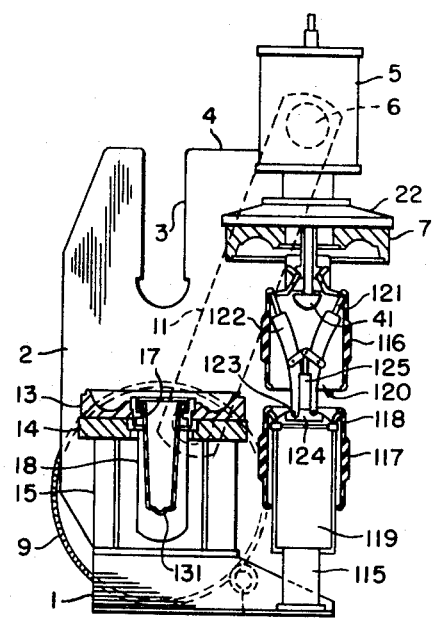
FIGS. 6 through 16 are schematic vertical sections of the press illustrating the various steps in a complete cycle of operation.

The basic press design may be that of the aforementioned widely known "Autoform" press and is perhaps best illustrated in FIG. 6. Referring to such figure, it will be seen that the press comprises a base 1 having at the sides thereof a pair of upstanding plates 2 each having a vertical guide slot 3 therein communicating with the top edge 4. The press head or beam 5 which extends between the upstanding plates 2 is supported for horizontal and vertical movement along the surface 4 and slot 3, respectively by rollers 6. The upper mold section 7 or mold sections, if the press is of the dual type having side-by-side molds, is pendantly mounted beneath the beam or head 5. Movement of the press head through the vertical and then lateral movements required to open the press as shown in FIG. 6 is obtained by a pair of bull gears 9 mounted on each side of the press which may be driven for rotation through motor driven gear reducers driving pinions 10 in mesh with the bull gears. The bull gears are connected to the press head by means of side links 11 so that as the bull gears rotate, the head 5 will be moved in a fashion guided by the surfaces 3 and 4 of the side plates 2. It can be seen then that the press will be opened to the position shown in FIG. 6 by a clockwise rotation of the bull gears 9 and will be closed by a counterclockwise rotation thereof. The bottom mold section 13 is mounted on platen 14 on top of the frame 15 secured to the base 1.

Referring now additionally to FIG. 4, it will be seen that the bottom mold section 13 is provided with an annular toe ring 16 which has clamped to the interior thereof the annular edge of a forming bladder 17 which when the press is opened will be invaginated into well 18 in the frame 15 supporting the bottom mold section. The well 18 may be mounted for limited vertical movement to facilitate the clamping and unclamping of the upper edge of the bladder 17 so that the bladder may be quickly changed when required. The aforedescribed basic press design is conventional and reference may be had to the aforementioned Mallory et al. Pat. No. 3,065,499 and additionally to Mallory et al. Pat. No. 3,097,394 for more detailed illustrations of such press.

Referring further to FIG. 4, it will be seen that the upper mold section 7 is provided with a toe ring 20 vis-a-vis the toe ring 16 of the lower mold section 13 in the closed position of the press. Situated above the upper mold section 7 is a steam platen or chamber 21 which is in turn secured to the bolster plate 22 with a layer of insulation 23 being provided therebetween. The bolster plate 22

4 includes an inwardly directed annular flange 25 which fits within a downwardly projecting shoulder of large annular adjusting screw 26. The flange 25 is retained within such shoulder by ring 27 secured to the bottom of the screw by fasteners 28. The screw 26 is in threaded engagement with large nut 29 which is in turn secured to the box section fabricated beam or head 5. Such beam may include top and bottom plates 30 and 31, the ring 32, and an upstanding reinforcing member 33 surrounding the nut 29. It will thus be seen that rotational adjustment of the screw 26 within the nut 29 may be employed vertically to adjust the position of the top mold 7 so that the press may accommodate molds of different sizes.

An upstanding heat shield 35 may be provided projecting from the plate 14 to surround the mold sections as the press closes for retention of heat.

THE TIRE CHUCK

Referring now more particularly to FIGS. 1 through 5, it will be seen that there is mounted in the press head concentric with the upper mold section 7 a bladder ram 40 having a hemispherical nose 41 on the lower end thereof having a diameter substantially larger than that of the ram providing an upwardly facing shoulder 42. The bladder ram 40 is provided with a piston 43 confined within tire stripping tube 44. The upper end of the tire stripping tube 44 is threadedly connected to cap 45 in which is secured sleeve 46 having a retaining ring 47 on the end thereof. The bladder ram 40 passes through the sleeve 46 and ring 47 with a spring loaded packing gland 48 slidingly sealing the bladder ram 40 in the upper end of the tire stripping tube 44. The cap 45 is connected at 50 to the rod 51 of piston-cylinder assembly 52 mounted on the top plate 30 of the head 5.

The lower end of the tire stripping tube 44 is closed about the ram 40 by sleeve assembly 54 having spring loaded packing gland 55 therein. It can thus be seen that variations in pressure within the tire stripping tube 44 on the opposite sides of the piston 43 will cause the bladder ram 40 having the nose 41 on the end thereof to extend and retract.

Surrounding the tire stripping tube 44 is a chuck sector plate actuator tube 57, the top of which is provided with a stop plate 58 having a lateral extension connected at 59 to the rod 60 of piston-cylinder assembly 61. The rod end of the piston-cylinder assembly 61 is mounted on a bracket plate 62 secured to the cap 45 and, of course, movable therewith. It can now be seen that extension of the piston-cylinder assemblies 61 will cause the chuck sector plate actuator tube 57 to move downwardly with respect to the tire stripping tube 44.

Figure 1:
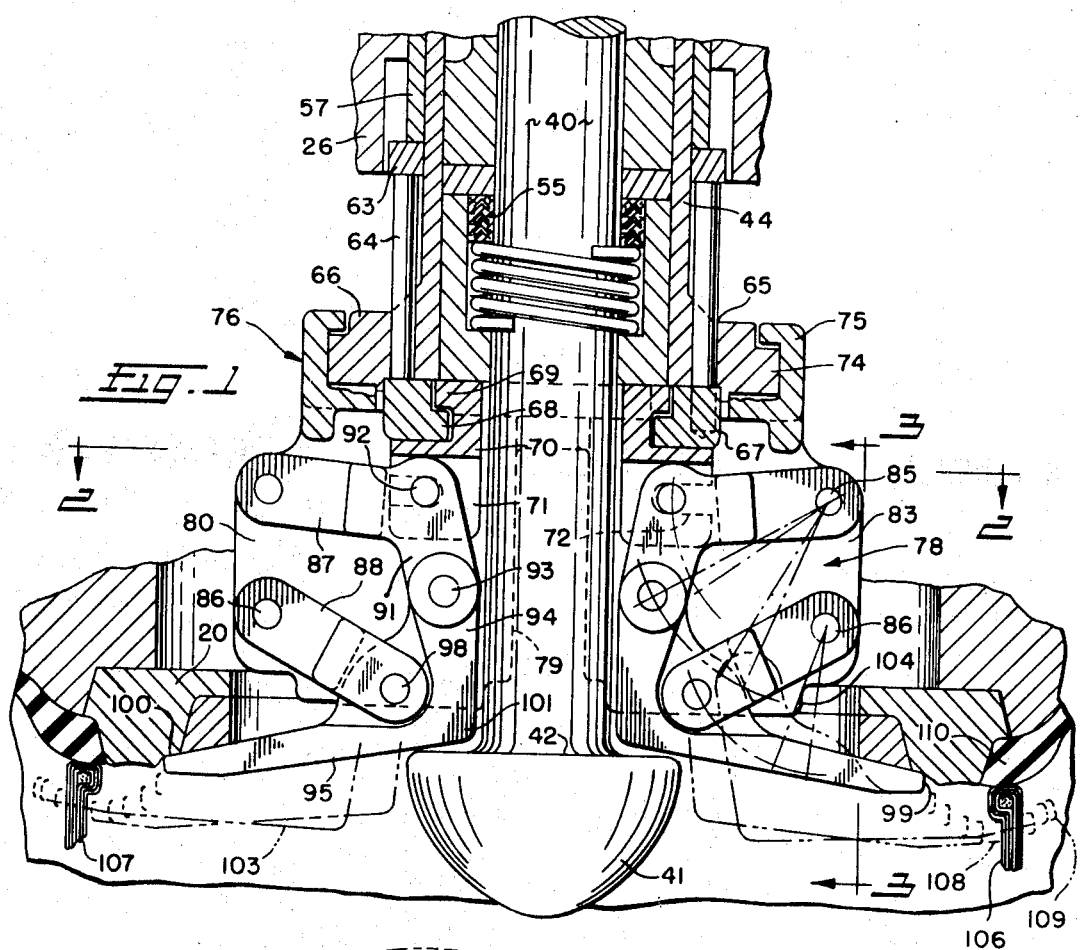

Referring now more particularly to FIG. 1, it will be seen that the lower end of the sector plate actuating tube 57 is provided with a ring 63 and four quadrant spaced vertically extending rods 64 project downwardly from the ring 63 through apertures 65 in flange 66 extending radially from the bottom of the tire stripping tube 44. A further ring 67 having inwardly directed lower shoulder 68 thereon is mounted on the lower ends of the rods 64. The inwardly directed shoulder 68 interfits with an outwardly directed shoulder 69 on ring 70 which is provided with four quadrant spaced downwardly extending projections 71 having horizontal slots 72 in the outer edges thereof.

Figure 2:
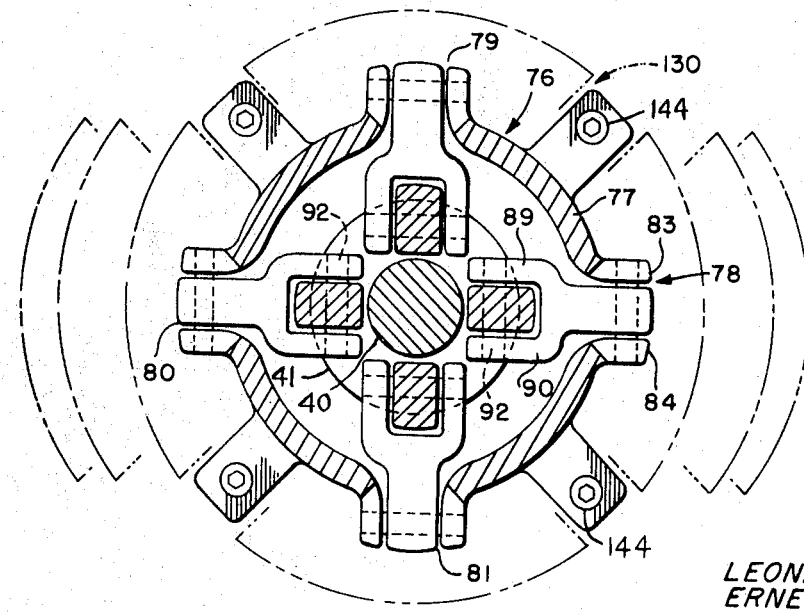
FIG. 2 is a fragmentary horizontal section taken substantially on the line 2—2 of FIG. 1 showing the various positions obtainable by the chuck sectors.
Figure 3:
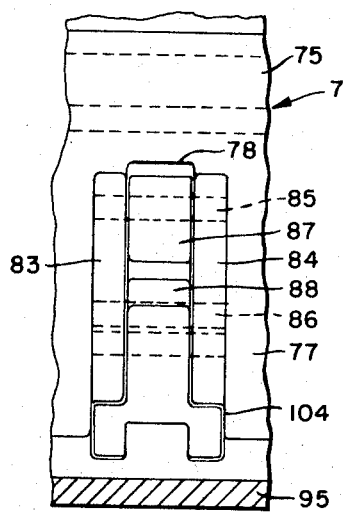
FIG. 3 is a fragmentary vertical section taken substantially on the line 3—3 of FIG. 1.

The flange 66 on the lower end of the tire stripping tube 44 includes an outwardly projecting shoulder or flange 74 which is enclosed by the upper U-shape annular upper portion 75 of housing 76. The housing 76 includes an annular depending skirt portion 77 provided with four quadrant spaced vertical slots 78, 79, 80 and 81 as seen in FIG. 2, each of which is provided with vertical marginal flanges 83 and 84. Pivotally mounted on vertically spaced pins 85 and 86 extending between each of the pair of flanges are yoke links 87 and 88, respectively. The upper link 87 of each pair of links includes an inner bifurcated portion providing legs 89 and 90 which include elbows therein providing downwardly offset end portions 91. A pin 92 extends between the legs at the upper end of the offset portion and such pin of each link 87 is confined within the horizontal slot 72 of the respective downwardly extending projections 71 on the ring 70. The lower ends of the offset portions 91 of the legs 89 and 90 are connected by pin 93 to the upper end 94 of the respective chuck sector plates 95. The lower links 88 of each pair include inner bifurcated portions providing legs which straddle webs 97 provided in the throat of each sector plate and are connected by pins 98 thereto. The sector plates 95 which form the chuck segments are provided with circular outer edges 99 which nest in recess 100 in the upper toe ring 20 in the fully retracted position of the chuck. The heel of the sector plates 95 shown at 101 fits closely within the upwardly extending shoulder 42 provided by the nose 41 of the ram 40 when the latter is retracted. The ram, of course, may be extended slightly to permit the chuck sector plates to swing to their open, tire engaging, positions. The planar outline as well as the positions obtainable by the chuck sector plates 95 are shown in phantom line position in FIG. 2.

It can now be seen that vertical movement of the chuck sector plate actuating tube 57 with respect to the tire stripping tube 44 will cause the chuck sector plates 95 to swing to the phantom line positions indicated at 103 in FIG. 1. The extent of such relative vertical movement of the two tubes 57 and 44 will, of course, control the tire engaging diameter of the chuck segments in their extended position. It is noted that the slots 78 through 81 at their lower ends may be cut-away as indicated at 104 to permit the bifurcated lower links 88 of each pair to swing to the almost vertical position required in the maximum extension of the sector plates.

Referring further to FIG. 1, it will be seen that the sector plates 95 may thus be caused to extend beneath the upper bead 106 of the green tire 107 shown. The edges 99 of the sector plates will then move beneath the slight inwardly directed shoulder of the upper bead 106 which is characteristic of green tires. It will be appreciated that in preformed tires or in shoulder built truck tires, the shoulder provided at the upper bead may be even greater. Also, it can be seen that as the edges 99 of the chuck sector plates engage the green tire, they will automatically center the upper bead 106 with respect to the top toe ring 20. In the case of preformed or C-shape tires, the top of the sector plates may be provided with a centering ridge or shoulder to engage the upper bead. Thus for picking up the green tires, the chuck sector plates would be extended to the phantom line position shown at 108 for the edge 99. However, to strip the molded tire from the press, the chuck sector plates would normally be extended even further to the phantom line position shown at 109 for the edges 99 more fully to underlie the molded bead 110 of the shaped tire.

TIRE PRESS OPERATIONAL CYCLE

Referring now to FIG. 6, it will be seen that the tire press may be situated such that the press head 5 moves upwardly through the slot 3 and forwardly along the top guide surface 4 of the side plates 2 to position the head and the mold 7 dependantly supported therebeneath in a forwardly offset clearing the lower mold 13 for overhead loading. In conventional "Autoform" presses, the upper mold section moves upwardly and rearwardly to expose the lower mold section for loading. On the contrary, as seen in FIG. 6, the right hand side of the press as shown may be considered the front of the press and the left hand side the rear.

A stand 115 may be mounted at the front of the press to support green tires 116 and 117 in a vertical stacked relation for loading into the mold formed by the upper and lower mold sections 7 and 13. In this manner, the operator may place two green tire carcasses ahead of each mold to obtain what is known as a "random" cure. The stand may include lower radially projecting spring latch fingers 118 adapted to engage the upper bead of the carcass or green tire 117 in much the same manner as disclosed in the stand of the aforementioned copending Heston et al. application. Supported on a pneumatic cylinder indicated generally at 119 is a vertically movable upper stand 120 which also includes a plurality of spring latch bead engaging fingers 121 mounted on arms 122 which are pivoted at 123 to the movable base 124 of the upper stand. Pivoting movement of the arms 122 about the proximal pivots 123 may be obtained by the piston-cylinder assembly 125 radially to move the arms 122. With such arms 122 in their radial innermost positions, the operator may then telescope a green tire carcass 117 over the upper stand and cause the same to be seated in the manner shown on the fingers 118 to be suspended in a telescoping manner about the cylinder assembly 119 suspended from the upper bead. Retraction of the piston-cylinder assembly 125 may then be employed radially to move the arms 122 outwardly so that the second green tire 116 may then be telescoped over the arms to be caught by its upper bead in the suspended position from the fingers 121. In this manner, two tires may then be placed in front of each mold.

Figure 7:
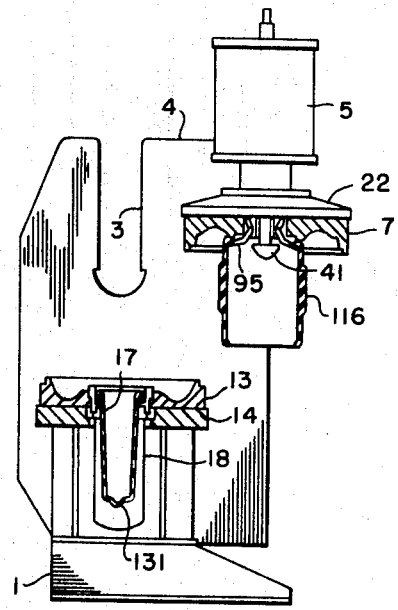

As the press opens, the top mold section moves upwardly and then laterally to the position shown in FIG. 6 and it will be appreciated that the axis of the upper mold section 7 will be maintained in a vertical position by an auxiliary cam slot in the plates 2 and a guide secured to the press head. Reference may be had to the aforementioned Mallory et al. Pat. No. 3,065,499. When the upper mold section is in the position shown in FIG. 6, the piston-cylinder assembly 52 mounted on the press head 5 will be caused to be extended to position the chuck sector plates 95 within the upper end of the green tire 116 beneath the upper bead thereof. Now, the piston-cylinder assembly 61 is caused to extend moving the sector actuating tube 57 downwardly with respect to the tire stripping tube 44 causing the chuck sector plates to swing outwardly to the intermediate position shown in phantom lines in FIGS. 1 and 2. At such position, the outer edges 99 of the chuck sector plates will engage beneath the upper bead of the green tire and will center such upper bead with respect to the upper mold section. As seen in FIG. 2, the space 130 between the sector plates will interfit with the fingers 121 supporting the green tire 116 by its upper bead. With the chuck sector plates in proper engagement with the upper bead of the green tire 116, the piston-cylinder assembly 125 may now be extended retracting the arms 122 and the piston-cylinder assembly 52 may now be retracted lifting the entire chuck assembly to seat the upper bead of the green tire 116 in proper registry with the toe ring of the upper mold section as seen in FIG. 7. At this time, the piston-cylinder assembly 119 may now be retracted lowering the arms 122 to position the fingers 121 thereon horizontally in alignment with the latch fingers 118 to grip the upper head of the lower green tire 117 to elevate the same for loading during the next cycle.

Figure 8:
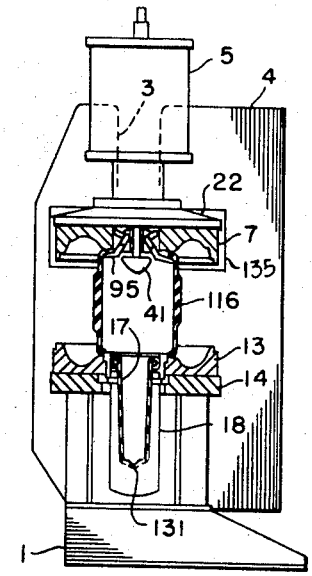
Figure 9:
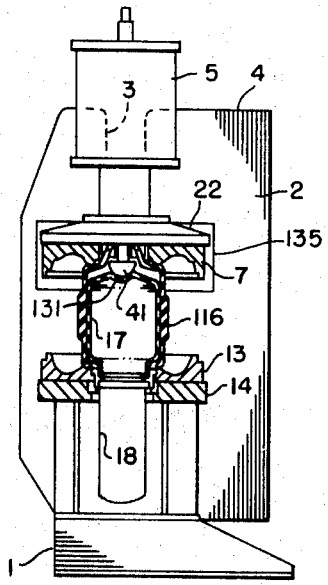

Moving on now to FIGS. 7 and 8 with the green tire 116 suspended by the chuck segments and in registry with the toe ring of the upper mold section, the press then begins to close. The press head 5 moves laterally along the guide surface 4 and then vertically downwardly within the slots 3 and may seat the green tire 116 in registry with the toe ring 16 of the bottom mold section as seen in FIG. 8. The press at this time stops its closing movements and pressure is now supplied to the interior of the well 18 causing the bladder 17 to extend upwardly into the green tire. The bladder under medium pressure engages the interior of the green tire and now holds the same in its registered position as seen in FIG. 9.

Figure 10:
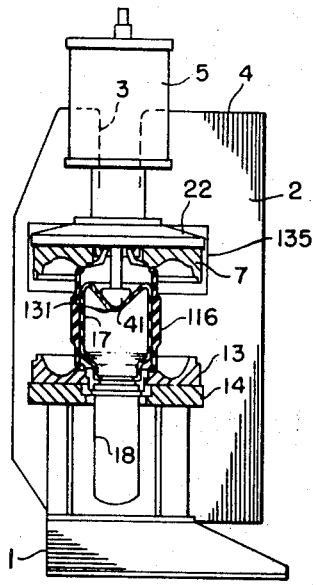

At this time, the stripping ram 40 extends downwardly approximately six inches and the piston-cylinder assembly 61 is then fully retracted moving the actuator tube upwardly with respect to the tire stripping tube 44 causing the ring 67 to seat against the bottom of the flange 66 as seen in FIG. 1 retracting the sector plates 95 into the recess 100 as seen in FIG. 10.

Figure 11:
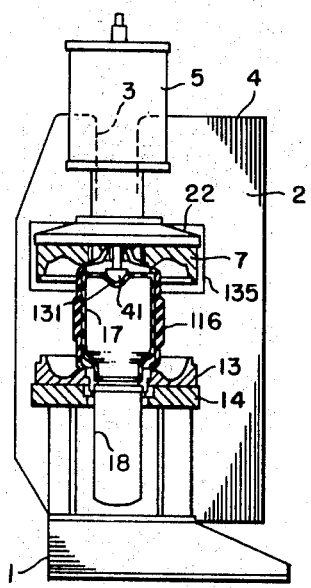
Figure 12:
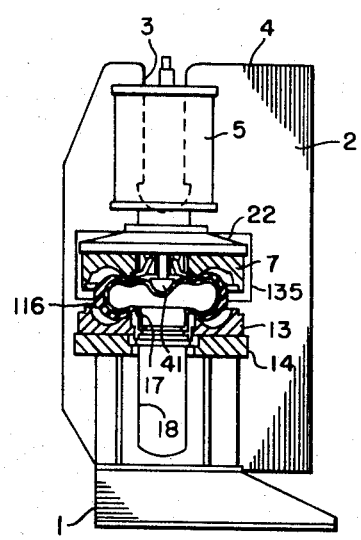
Figure 13:
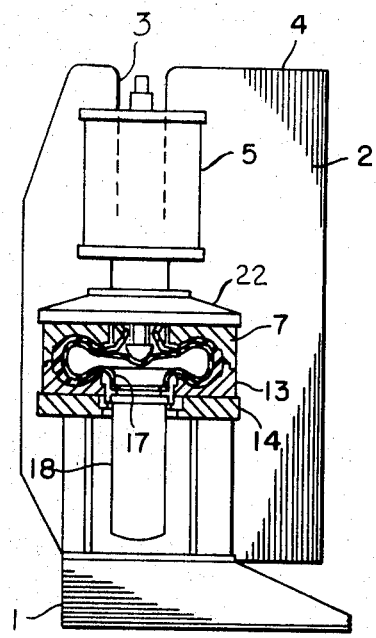
Figure 14:
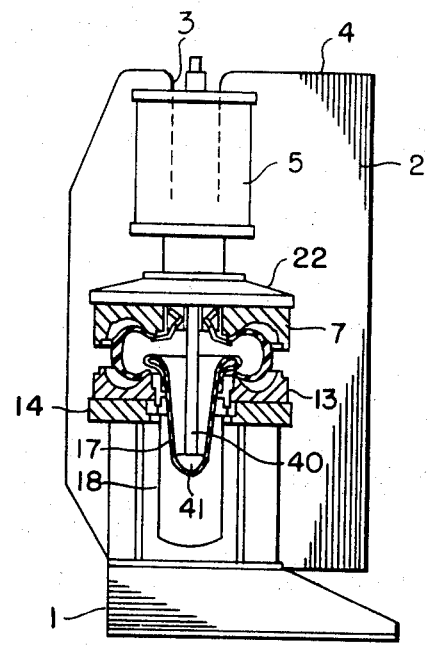

The stripping ram is now retracted and the nose 41 thereof will engage within a molded recess 131 in the bladder assisting in the centering of the bladder with respect to the mold sections and green tire. The pressure within the bladder is now increased when the stripping ram is retracted as seen in FIG. 11 and the press now continues its closing operation with the press head and top mold section descending to shape the tire as seen in FIG. 12. The press then closes fully as seen in FIG. 13 and remains in such position during the curing cycle.

Figure 15:
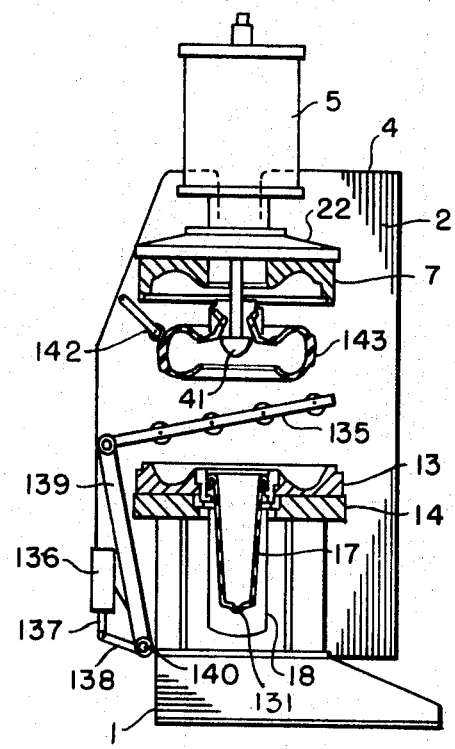

After the timer indicates the completion of the curing cycle, the opening cycle begins with the stripping ram 40 extending downwardly and simultaneously the sector plates extending to the phantom line position 109 shown in FIG. 1 underlying the upper bead of the tire. The extension of the sector plates is, of course, accomplished by the extension of the piston-cylinder assembly 61. The ram 40 continues downwardly to invaginate the bladder 17 back into the well 18 and the press begins to open. As the press opens, the stripping ram 40 is elevated, but the sector plates 95 continue to underlie the upper bead of the cured tire. When the press head has reached a position at the top of the slot 3, the inclined discharge conveyor 135 may be pivoted into position by piston-cylinder assembly 136 as seen in FIG. 15. The rod 137 of the assembly 136 is connected to crank arm 138 pivoting arm 139 about the pivot 140. When the discharge conveyor is properly thus positioned, the piston-cylinder assembly 52 may be extended permitting stripping bar 142 to move above the shaped tire indicated at 143 stripping the same from the upper mold section 7. It will be appreciated that the top toe ring 20 can be mounted for movement with the segment housing 76 as by the fasteners 144 seen in FIG. 2 to ensure proper stripping of the tire from the upper mold section as the piston-cylinder assembly 52 is energized.

Figure 16:
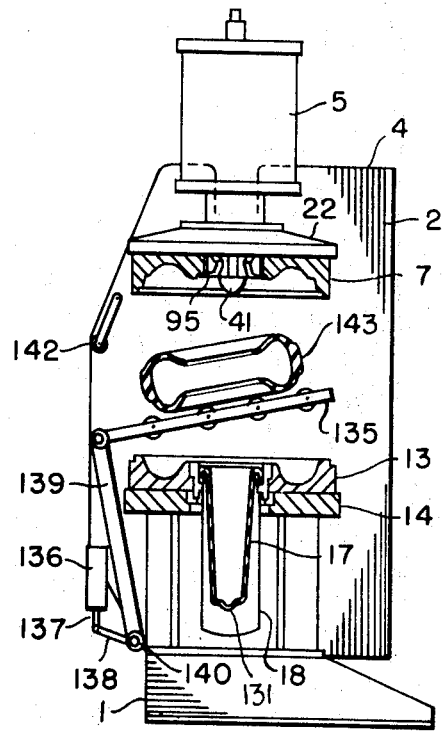

Now referring to FIG. 16, the piston-cylinder assembly 61 may be retracted to pull the sector plates back into the recess in the toe ring permitting the tire to drop onto the discharge conveyor 135. The tire may then slide into a post cure inflating machine or onto a take-away conveyor normal to the plane of FIG. 16. When the cured tire has cleared the press, the discharge conveyor 135 will be pivoted out of the way and the press head will move back to the position shown in FIG. 6. The fingers 121 on the arms 122 now engaging the top bead of the green tire 117 will then be elevated to position the next green tire to be gripped by the sector plates as in FIG. 6. The cycle of operation is then repeated. While the next green tire is curing, the operator may then recharge the stand 115 with two additional green tires.

THE EMBODIMENT OF FIGS. 17 THROUGH 19

In FIG. 17, there is illustrated a press similar to that shown, for example, in FIG. 6, but wherein the press head slides back for unloading with loading being accomplished from the front of the press and the green tire being placed on the stationary bottom mold section. The press comprises a base 150 having upstanding side or cam plates 151. The base includes a frame 152 containing well 153 for bladder 154. The bladder is secured to the bottom toe ring 155 of the bottom stationary mold section 156 which is supported on the frame or base through heating platen 157.

The upper or movable top mold section 160 is supported from bolster 161 through heating platen 162 pendantly secured to head or frame 163. The head 163 is in turn supported through oppositely directed pins having rollers 165 thereon which are followers riding on the cam surface 166 and within the cam slot 167 in the side plates 151. The pins supporting the cam followers 165 are supported through links driven by large bull gears at opposite ends of the press as shown at 11 and 9, respectively, in FIG. 6. In this manner, the press may be opened and closed for loading and unloading.

The press head includes a bladder ram 170 having a ball nose 171 on the end thereof adapted to engage the bladder at 172 to invaginate the same into the well 153 stripping the bladder from the cured tire 174. The bladder ram also operates a tire stripping chuck 175 which ensures that the cured tire will be carried with the upper mold section 160 as the press opens. The vertically movable top toe ring 176 strips the tire from the top mold section and when the toe ring and stripping chuck, the latter retracted, are elevated, a retractable stripping bar 177 guarantees that the cured tire 174 will dop onto discharge conveyor 178 to roll into a post cure inflating machine, for example.

While the press is open and the tire 174 is being discharged therefrom, the new green tire 180 is positioned on the bottom mold section 156 by the loader shown generally at 181. This loader may be substantially the same as the loader shown in detail in FIGS. 1 and 2 which is contained within the upper movable mold section of the press of that embodiment.

In this embodiment, however, the loader 181 is mounted for vertical movement on guides 182 supported by brackets 183 from the press head 163. The loader includes a carriage shown generally at 184 which includes two end plates 185 with a transverse channel-shape beam 186 extending therebetween. The carriage is connected to chain 187 trained about top and bottom sprockets 188 and 189, the former being reversibly motor driven. Reference may be had to the aforementioned Heston et al. Pat. No. 3,229,329 for a more clear disclosure of the loader carriage and supporting guides that may be utilized with the present invention.

The loader 181 in a conventional dual cavity press may include two side-by-side chucks, shown in greater detail in FIG. 18. These chucks in the opened position of the press are vertically aligned with the bottom mold sections 156. Each chuck includes a vertically extending tubular post 190 secured to the underside of the transverse beam 186. The post 190 houses a piston-cylinder assembly 191, the rod 192 of which is connected to a spider 193 having four quadrant spaced radially extending arms 194 which project through vertically elongated slots in the tubular post as seen at 195. The arms 194 support vertically extending links 197 connected to bell cranks 198 through the pin-slot connection shown. Such bell cranks are pivoted at 199 to brackets depending from the arms of spider 200 secured to the exterior of the tubular post 190. The links 197 pass vertically through the spider through the openings shown. The bell cranks 198 are also pin-connected to the upper offset proximal ends of the chuck elements 201 as shown at 202. The chuck elements are also supported by links 203 pivoted at 204 and 205, the latter pivot being to an extension of the brackets supporting the bell crank pivot 199 depending from the arms of the spider 200. The pivot 204 is radially offset from and slightly below the proximal pivot 202 for such chuck elements.

Each of the chuck elements 201, which may be four in number, are of the pie shape configuration seen more clearly in phantom lines in FIG. 2 and include a horizontally planar top surface 207, a horizontally planar bottom surface 208, and a substantially circular outer edge 209 which may extend approximately 90°.

To retract the chuck, the piston-cylinder assembly 191 is extended and the spider 193 moves to its upper limit pulling up on the links 197 to pivot the bell cranks 198 about their fixed pivots 199 retracting the chuck elements into a nested horizontal position about the tubular post 190. In such position, the elements form a circular annular flat plate. To extend the chuck elements, the piston-cylinder 191 is retracted and it will be seen that the peripheral circular edges 209 move to the phantom line position seen at 211 and 212 in FIG. 18.

As indicated in the extended position of the chuck elements, the outer peripheral edges thereof will underlie the upper bead 215 of the tire 180 and in the inner or retracted position, the outer edge will closely fit within the bead blocking swelling of the bladder 154 thereabove. In a more conventional green tire carcass a shown at 106 in FIG. 1 or 116 in FIG. 6, the outer circular edges of the chuck elements may actually engage the green tire interiorly and below the upper bead.

The lower end of the tubular post 190 is provided with a pilot nose 216 which may mate with the recess 172 in the bladder to assist in centering thereof. If the loader is utilized with an upstanding bladder type press, it will be appreciated that a flat plate may be substituted for the nose 216 and that such plate may be provided with a recess to receive the bladder mechanism. In any event, the loader can be used to facilitate the centering of the green tire both with respect to the bottom mold section and the bladder, whether of the type shown in FIG. 17 or the upstanding type.

FIG. 17 illustrates the tire 180 being placed in the bottom mold section and a further tire 220 positioned on stand 221 in front of the press. Such stand may comprise four upstanding hands 222 radially adjustably supported on base 223 in turn supported on the floor 224. Such hands include outer peripheral upstanding flanges 226 and horizontal bottoms or palms 227 which cup and support the tire 220 to be picked up by the loader.

Radial adjustment is obtained through the slot 228 in the base 223 and the hands may be locked in the desired position of radial adjustment by the thumb screw seen at 229.

In operation, the loading chuck, in its retracted condition with the piston-cylinder assembly 191 extended and with the press closed, will descend along the guide 182 until the circular chuck plate clears the bead of the tire 220. The chuck may now be expanded so that the outer circular edges 209 of the chuck elements extend beneath the upper bead and such edges may actually engage the interior of the green tire as seen in FIG. 1. The loader is now elevated to lift the green tire from the stand 221 and a further green tire may now be placed on the stand. The press will remain in its closed position during the cure cycle and when the press opens to the position seen in FIG. 17, the loader will be automatically positioned over the bottom mold section with the tire in the press being carried to the position of the tire 174. The loader now descends to place the green tire on the bottom mold section with the bottom bead in contact with or slightly above the bottom toe ring 155. At this point, and with the loader still engaging and supporting the tire, the bladder is invaginated into the tire by pressurizing the well 130. When the bladder engages the tire, the chuck may be retracted by extension of the piston-cylinder assembly 191 and the retraction will form a closure plate for the bladder maintaining the bladder within the green tire. After the green tire is properly secured by the bladder, the loader may be elevated and the press commences its closing cycle.

It will be appreciated that the plate-type loader of the present invention instead of being mounted for vertical movement on the press head as illustrated in FIG. 17, may be mounted on a pivoting stand in front of the press to swing or move over the bottom mold section as the press opens.

It can now be seen that there is provided a tire curing press wherein the green tire is brought into proper registry within the upper mold section by the loading sectors and the closing movement of the press then properly registers the tire with the lower mold section to receive the bladder inflated therein. In this manner, it is ensured that both the tire and the bladder will be properly centered in the press prior to closing every time. It will also be appreciated that the radial movement of the chuck sectors may vary to accommodate tires having a wide variety of bead sizes. Also, instead of a vertically indexed two tire stand, horizontal indexing may be employed to position the tire for gripping by the sector plates.

With the embodiment of FIG. 17, it will be seen that a horizontal plate type chuck is provided with the outer circular edges of the plates moving radially to grip the interior of the green carcass. Such chucks when closed constitute closure plates for the upper end of the green tire and these chucks can place the tire properly on either the upper or lower mold sections.

Other modes of applying the principles of the invention may be employed, change being made as regards the details described, provided the features stated in any of the following claims or the equivalent of such be employed.

We, therefore, particularly point out and distinctly claim as our invention:

1. A loader for a tire curing press of the type having a stationary bottom mold section and movable top mold section, said loader comprising a chuck having a plurality of horizontally disposed substantially flat radially movable plates, said plates having arcuate outer edges, means operative to move said chuck vertically within a green tire, means supporting said plates for radial movement while maintaining said plates substantially horizontal during such radial movement to grip the interior of such green tire with the outer edges of said plates, means for effecting such radial movement of said plates, and means for moving said chuck while thus supporting such green tire to place the tire in registry with the stationary bottom mold section.

2. A loader as set forth in claim 1 wherein said plates in their retracted condition constitute a substantially circular closure plate for the upper bead of the tire.

3. A loader as set forth in claim 1 wherein said means for supporting said plates as aforesaid includes a pair of radially spaced links for each plate, said links maintaining said plates substantially horizontal in all positions thereof while moving said plates slightly downwardly upon extension and upwardly upon retraction.

4. A loader as set forth in claim 3 wherein said means for effecting such radial movement of said plates includes a vertically extending piston-cylinder assembly in the center of said chuck operative to move said links and hence to move said plates horizontally.

5. A loader as set forth in claim 3 wherein said chuck further includes a movable carriage, one end of each said link being pivoted to the respective plate and the opposite end being pivoted to said carriage.

6. A tire curing press as set forth in claim 5 wherein said means for effecting such radial movement of said plates as aforesaid comprises a vertically movable actuator, the radially inner one of each pair of links being connected to said actuator to move said plates as aforesaid.

7. A loader as set forth in claim 1 wherein said means for supporting said plates as aforesaid includes a pair of radially spaced links for each of said plates, the inner of each pair of links being in the form of a bell crank, and said means for effecting such radial movement of said plates as aforesaid comprises an actuator connected to said bell cranks to move said links and hence to move said plates horizontally.

8. A tire curing press comprising a stationary bottom mold section and a movable top mold section, means for moving said top mold section away from and then laterally of said bottom mold section to open said press and return; a loader comprising a chuck having a plurality of horizontally disposed substantially flat radially movable plates, said plates having arcuate outer edges, means for moving said chuck vertically within a green tire, means supporting said plates for radial movement while maintaining said plates substantially horizontal during such radial movement to grip the interior of such green tire with the outer edges of said plates, means for effecting such radial movement of said plates, and means for moving said chuck while thus supporting such tire to place the tire in registry with said stationary mold section.

9. A tire curing press as set forth in claim 8 wherein said means supporting said plates for radial movement as aforesaid includes plural links for maintaining said plates substantially horizontal as they are swung radially outwardly and downwardly, and said means for effecting such radial movement of said plates as aforesaid comprises a vertically movable actuator connected to said plates.

References Cited

UNITED STATES PATENTS

| | | | |
|---|---|---|---|
| 2,997,738 | 8/1961 | Soderquist | 18—2 X |
| 3,065,503 | 11/1962 | Mallory et al. | |
| 3,097,394 | 7/1963 | Mallory et al. | 18—2 X |
| 3,167,810 | 2/1965 | Soderquist | 18—2 |
| 3,229,329 | 1/1966 | Heston et al. | 18—2 |
| 3,267,515 | 8/1966 | Ulm | 18—2 |
| 3,378,882 | 4/1968 | Turk et al. | 18—2 |

J. HOWARD FLINT, JR., Primary Examiner